United States Patent [19]

Balaban et al.

[11] 4,453,183

[45] Jun. 5, 1984

[54] DUAL POLARITY SYNC PROCESSOR

[75] Inventors: Alvin R. Balaban, Lebanon; Steven A. Steckler, Clark, both of N.J.

[73] Assignee: RCA Corporation, New York, N.Y.

[21] Appl. No.: 351,308

[22] Filed: Feb. 22, 1982

[51] Int. Cl.³ .................................................. H04N 5/06
[52] U.S. Cl. .................................. 358/148; 358/153; 358/154
[58] Field of Search ............... 358/148, 150, 152, 153, 358/154; 328/139

[56] References Cited

U.S. PATENT DOCUMENTS

| | | | |
|---|---|---|---|
| 3,527,887 | 9/1970 | Glapp | 358/153 |
| 4,097,896 | 6/1978 | Avery | 358/153 |
| 4,185,299 | 1/1980 | Harford | 358/153 |
| 4,237,487 | 12/1980 | Ikeda et al. | 358/154 |
| 4,266,245 | 5/1981 | Balaban | 358/153 |

*Primary Examiner*—Tommy P. Chin
*Attorney, Agent, or Firm*—Paul J. Rasmussen; William H. Meise; Scott J. Stevens

[57] ABSTRACT

A synchronizing pulse processor accepts integrated and differentiated composite sync signal inputs of either positive or negative polarity. Processed horizontal and vertical sync pulses are produced which have a single predetermined polarity independent of the polarity of the composite sync signal. The polarity of the differentiated composite sync signal is used to select the reference level for the vertical sync pulse threshold detector. The sync processor may be formed as a part of an integrated circuit and require only two input interface terminals regardless of composite sync signal polarity.

14 Claims, 4 Drawing Figures

DUAL POLARITY SYNC PROCESSOR

This invention relates to processing of horizontal and vertical synchronizing pulses and in particular, to a sync processor which may be formed as a portion of an integrated circuit for universal application in television receivers.

BACKGROUND OF THE INVENTION

The composite video signal utilized by a television receiver contains horizontal and vertical synchronizing information which is used by receiver synchronizing circuitry to provide accurately timed scanning of the kinescope electron beams from line to line and frame to frame. In the NTSC standard, a transmitted television signal is composed of a radio frequency (rf) carrier signal which is modulated with the composite video signal to form an amplitude modulated ac signal with the composite video signal defining the envelope of the modulated rf carrier. This modulated rf carrier signal is applied to tuner and intermediate frequency (IF) circuitry, producing a heterodyned output signal which is demodulated by a video detector which reproduces the composite video signal.

The input to the video detector is an amplitude modulated signal, so it is possible to reproduce the composite video signal by detecting either the upper envelope portion having positive-going sync pulses with the video black level positive with respect to the video white level or the lower envelope portion of the modulated signal having negative-going sync pulses with the video black level negative with respect to the video white level. The choice as to whether the upper "positive" or lower "negative" polarity envelope portion is selected may be determined by the choice of circuit components or processing techniques, some of which may operate more efficiently or technically superior with respect to one polarity signal over the other.

The demodulated composite video signal is applied to a synchronizing pulse (sync) stripper, which produces an output in response to the high amplitude (either positive-going or negative-going) horizontal and vertical sync pulses, hereinafter referred to as positive and negative polarity pulses regardless of the actual voltage levels of the pulses themselves. This composite sync signal is processed to separate the vertical and horizontal sync pulses from each other by differentiating the signal to reproduce the short duration horizontal sync pulses and integrating the signal to reproduce the long duration vertical sync pulses. The choice of sync separator components will of course be determined by the polarity of the composite sync signal. For example, for positive and negative polarity sync pulses, the vertical sync pulses will be reproduced by integrating the composite sync signal positively or negatively toward a threshold level, respectively. The threshold detection circuits must be designed to establish the proper threshold level and polarity.

It is desirable to provide many television receiver functions by forming the appropriate circuits as parts of integrated circuits, in order to reduce receiver size, weight and cost. For example, many receivers utilize an integrated circuit to provide accurately timed horizontal and vertical deflection drive pulses which are applied to the appropriate horizontal and vertical deflection circuits. These integrated circuits may include one or more frequency and phase control loops to provide extremely precise deflection timing. Since the horizontal and vertical deflection timing must be closely controlled with respect to the occurrence of horizontal and vertical sync pulses, the previously described deflection integrated circuits may also include a sync pulse processor which receives the differentiated and integrated composite sync signal from a sync separator. The sync pulse processor then produces horizontal and vertical sync pulses of a single predetermined polarity which are used to control other functions on the integrated circuit. Primarily because of the size of the capacitors in the differentiating and integrating circuits, it may not be practicable to form the sync separator circuitry as a part of an integrated circuit. It may be more efficient to provide the sync separator within the receiver as a discrete circuit having discrete components.

As discussed, the output from the sync separator may represent either positive or negative polarity sync pulses. In order to provide universal application to any receiver, the previously described deflection integrated circuit must include a sync processor which can accept differentiated and integrated sync signals of either positive or negative polarity. It is also desirable to eliminate any requirement for additional terminals or pins on the integrated circuit which might be used to select the sync pulse polarity for a particular receiver application in order to avoid an undesirable increase in the number of integrated circuit pins.

SUMMARY OF THE INVENTION

The present invention is directed to a synchronizing signal processor which accepts differentiated and integrated sync signals of either positive or negative polarity, and generates horizontal and vertical sync pulses of a single predetermined polarity. The sync processor may be formed as a portion of an integrated circuit and requires only two input pins.

In accordance with the invention, synchronizing apparatus is provided for use in a television receiver having a source of at least one of horizontal and vertical synchronizing pulse-related signals with the synchronizing apparatus capable of being used regardless of the polarity of the pulse-related signal. The apparatus comprises first sync processing means which is responsive to the synchronizing pulse-related signal of a first polarity for producing a synchronized output signal when energized.

Second sync processing means is responsive to the synchronizing pulse-related signal of a second polarity for producing an output signal when energized.

Means are provided which produce a control signal indicative of the polarity of the pulse-related signal. Means apply the polarity-indicative control signal to the first and second sync processing means for energizing one of the sync processing means in order to produce a synchronized output signal.

BRIEF DESCRIPTION OF THE DRAWING

In the accompanying drawing.

DETAILED DESCRIPTION

Figures 1, 1A:
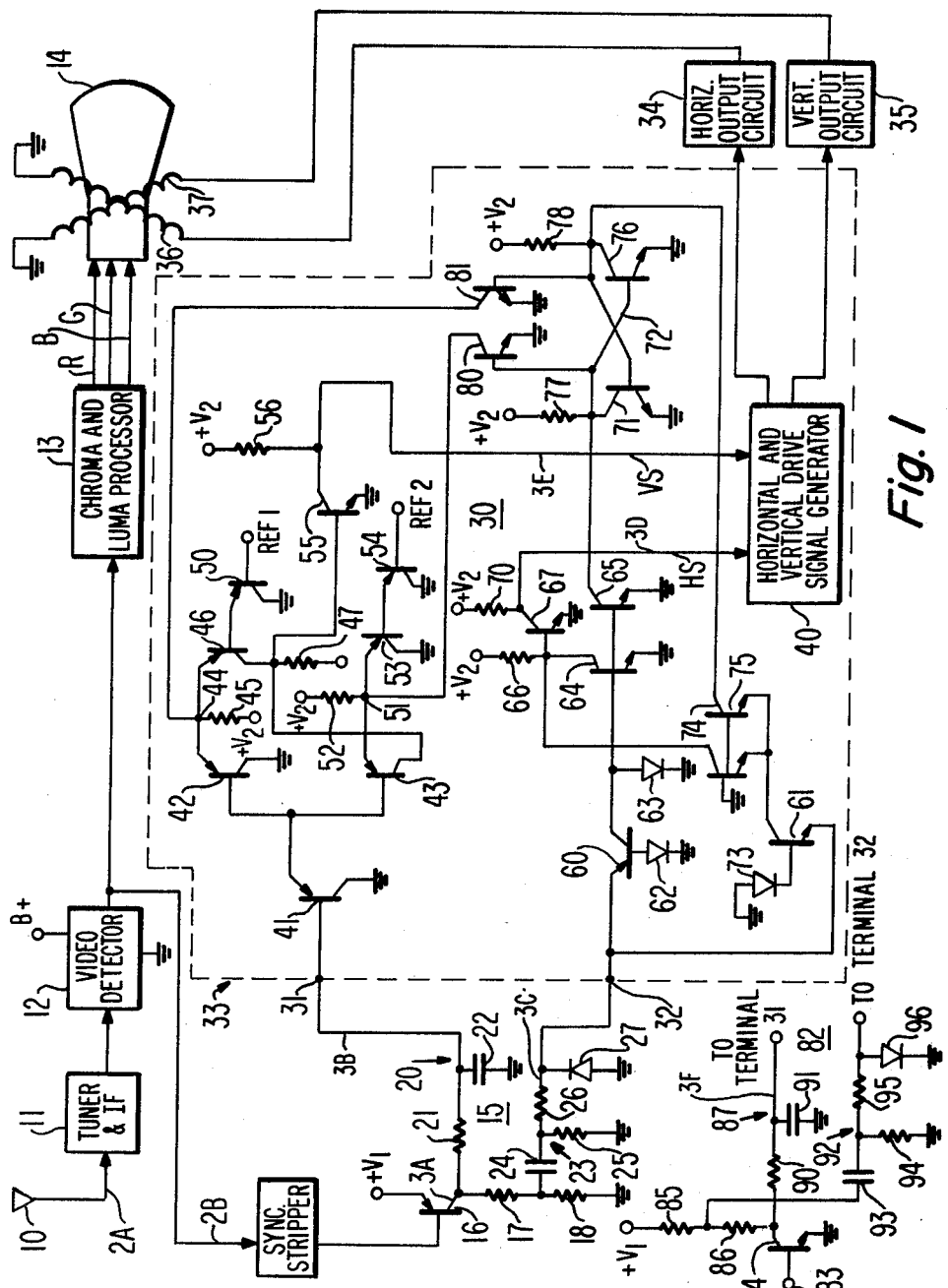
FIG. 1 is a block and schematic diagram of a television receiver illustrating a synchronizing signal processor in accordance with the present invention.
FIG. 1A is a schematic diagram of an alternative arrangement of a portion of the circuit shown in FIG. 1.
Figure 2:
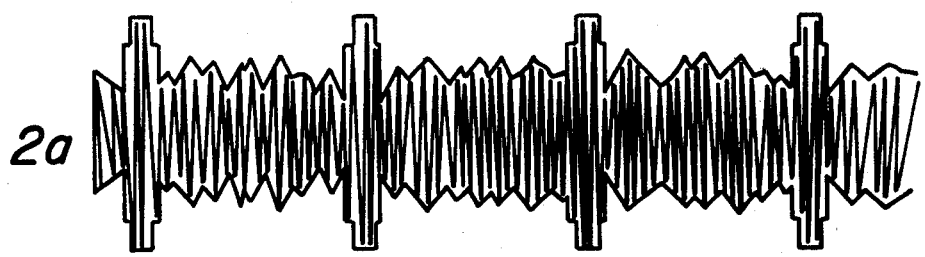
FIGS. 2a–2b illustrate waveforms associated with the operation of the circuit shown in FIG. 1, the locations of which are designated 2A–2B in FIG. 1.
Figure 2:

Referring to FIG. 1, there is shown a block and schematic diagram of a television receiver. Transmitted radio frequency signals, comprising an amplitude modulated carrier signal, such as is illustrated in FIG. 2a, are received at an antenna 10 and applied to tuning and intermediate frequency circuitry 11 which produces an amplitude modulated intermediate frequency signal, also similar in appearance to the waveform of FIG. 2a. This signal is demodulated by video detector 12 which reproduces the composite video signal modulating envelope, a portion of which is as shown in FIG. 2b. Video detector 12 may be designed to reproduce either the positive or negative polarity portion of the modulating envelope. The negative designated portion of the envelope is shown in FIG. 2b. This composite video signal is applied to a chrominance and luminance processor 13 which derives the red, green and blue color drive signals (R, G, B) which are in turn applied to a kinescope 14 in order to control the operation of an electron gun assembly (not shown).

The demodulated composite video signal from video detector 12 is also applied to a synchronizing (sync) puls stripper circuit 9, which clips the composite video signal in order to remove the horizontal and vertical synchronizing pulses. The output of sync stripper 9 is applied to a synchronizing pulse separator circuit 15. Sync separator 15 is shown illustratively designed to operate in response to the sync pulses recovered from the negative polarity portion of the modulating envelope. A sync separator which operates in response to the positive envelope portion will be described later.

Figure 3:
FIGS. 3a-3f illustrate additional waveforms associated with the circuits of FIGS. 1 and 1A, the locations of which are designated 3A-3F in FIGS. 1 and 1A.
Figure 3:
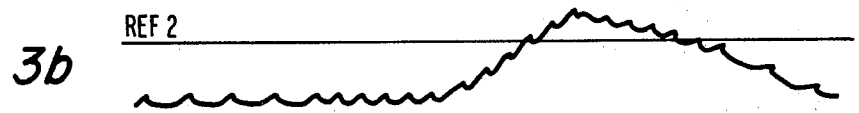
Figure 3:
Figure 3:
Figure 3:
Figure 3:
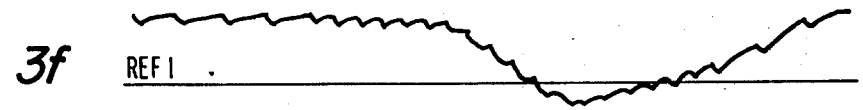

The output of sync stripper 9 is applied to the base of a switching transistor 16. Transistor 16 conducts when the input signal amplitude exceeds a predetermined level indicative of the presence of a sync pulse. The output at the collector of transistor 16 therefore represents a composite sync signal, such as is shown in FIG. 3a, comprising horizontal and vertical synchronizing information including vertical sync equalizing pulses. In order to separate the horizontal and vertical sync information components from each other, the composite sync signal is applied to a sync integrator 20, comprising a resistor 21 and capacitor 22, and to a sync differentiator 23, comprising a capacitor 24, resistors 25 and 26, and diode 27.

Capacitor 22 of sync integrator 20 charges from ground in response to the sync information components of the composite sync signal. The charging time constant is long compared to the duration of the horizontal sync components, so sync integrator 20 is substantially unresponsive to horizontal sync. The relatively long duration vertical sync components allows capacitor 22 to charge appreciably, such as shown by the waveform of FIG. 3b, so that a threshold detector may be used to produce a signal representative of vertical sync pulses. The operation of such a threshold detector will be described later.

Sync differentiator 23 responds to the positive and negative-going edges of the horizontal sync components and equalizing pulses and to the serrations present in the vertical sync components to form a horizontal sync related signal such as is shown in FIG. 3c. The negative-going portions of the differentiated sync signal illustrated in FIG. 3c are clipped by diode 27.

The integrated composite sync signal is applied to one input of a horizontal and vertical synchronizing pulse processor 30 via a terminal 31, and the clipped differentiated composite sync signal is applied to another input of sync pulse processor 30 via a terminal 32. Terminals 31 and 32 are illustratively shown as interface pins or terminals of an integrated circuit 33, which may, for example, provide deflection drive signals for horizontal and vertical deflection output circuits 34 and 35, respectively, which in turn cause deflection currents to flow in horizontal deflection coils 36 and vertical deflection coils 37, located on kinescope 14.

In addition to sync processor 30, integrated circuit 33 incorporates a horizontal and vertical drive signal generator 40, which receives horizontal and vertical sync pulses provided by sync processor 30 and generates accurately timed deflection drive signals for horizontal and vertical output circuits 34 and 35.

Drive signal generator 40 may comprise one or more frequency and phase control loop and countdown circuitry for producing horizontal and vertical rate drive signals from a clock signal.

The integrated composite sync signal at terminal 31 is applied to the base of a transistor 41 of sync processor 30. The collector of transistor 41 is grounded, while the emitter is coupled to the interconnected bases of transistors 42 and 43. The emitter of transistor 42 is coupled to a junction 44, which in turn is coupled via a resistor 45 to a source of potential $+V_2$ and to the emitter of a transistor 46. The collector of transistor 46 is coupled to ground via a resistor 47 and its base is coupled to the emitter of a transistor 50. Transistor 50 has its collector grounded and its base coupled to a source of reference potential REF 1.

Transistor 43 has its collector coupled to the collector of transistor 46 and its emitter is coupled to a junction 51, which in turn is coupled to the source of potential $+V_2$ via a resistor 52 and to the emitter of a transistor 53. The base of transistor 53 is coupled to the emitter of a transistor 54 which has its base coupled to a second source of reference potential REF 2.

The interconnected collectors of transistors 43 and 46 are coupled to the base of a transistor 55, which has its collector coupled to the source of potential $+V_2$ via a resistor 56. The collector of transistor 55 also provides processed vertical synchronizing pulses to horizontal and vertical drive signal generator 40 via a conductor designated VS.

The differentiated composite sync signal at terminal 32 is applied to the emitters of two transistors 60 and 61. The base of transistor 60 is coupled to ground via a diode 62, connected so that its anode is coupled to the base of transistor 60. The collector of transistor 60 is also coupled to ground via a diode 63 and to the base of two transistors 64 and 65. The collector of transistor 64 is coupled to the source of potential $+V_2$ via a resistor 66 and to the base of a transistor 67. The collector of transistor 67, referenced to the source of potential $+V_2$ via a resistor 70, provides processed horizontal synchronizing pulses to horizontal and vertical drive signal generator 40 by way of a conductor designated HS.

The collector of transistor 65 is coupled to the collector of a transistor 71, which forms part of a flip-flop circuit 72.

The base of transistor 61 is coupled to ground via a reverse-connected diode 73. The collector of transistor 61 is coupled to the emitters of two transistors 74 and 75, whose bases are grounded. The collector of transistor 74 is coupled to the base of transistor 67, while the collector of transistor 75 is coupled to the collector of a transistor 76, which forms part of flip-flop circuit 72.

The collectors of flip-flop circuit transistors 71 and 76 are coupled, respectively, to the bases of transistors 76 and 71, to the source of potential $+V_2$ via resistors 77 and 78, and to the bases of two transistors 80 and 81. The collector of transistor 80 is coupled to junction 51, while the collector of transistor 81 is coupled to junction 44.

The operation of sync processor 30 will now be described. When the amplitude of the positive-going differentiated horizontal sync components at the emitter of transistor 60 exceeds 2 $V_{BE}$, transistor 60 becomes forward biased and turns on. Transistor 60 is reverse biased and is cut off, thereby keeping transistors 74 and 75 off. With transistor 60 on, diode 63 conducts, raising the base voltage of transistors 64 and 65 sufficiently to turn them on. When transistor 64 turns on, its collector voltage is pulled low, which pulls the base of transistor 67 low, keeping transistor 67 off. The collector voltage of transistor 67 is therefore high, producing a positive output pulse to horizontal and vertical drive signal generator 40. Sync processor 30 therefore produces positive horizontal sync pulses, such as is shown in FIG. 3d, in response to a positive sync component input. The vertical sync pulses are generated in the following manner. With a composite sync signal having positive sync components, as previously described with respect to the horizontal sync components, the integrated composite sync signal will increase positively during the presence of vertical sync components. When transistor 65 turns on (as previously described), the collector of flip-flop transistor 71 goes low, keeping transistors 76 and 80 off, which causes their collectors to go high. This turns transistor 81 on, pulling its collector low, keeping transistors 42 and 46 nonconductive regardless of the amplitude of the integrated composite sync signal.

When the voltage amplitude of the integrated composite sync signal is below the voltage of reference potential REF 2, transistor 43 is forward biased. Conduction current of transistor 43 flows from the source of potential $+V_2$ through resistor 52, and through the emitter-collector junction of transistor 43 to the base of transistor 55. Current flow raises the voltage across resistor 47, turning transistor 55 on, causing its collector to go low so that its output pulse on conductor VS is low. When the integrated sync signal amplitude exceeds the voltage of REF 2, transistor 43 turns off. The voltage across resistor 47 decreases toward zero, turning transistor 55 off. This causes the collector to go high, producing a positive output pulse on conductor VS, such as is shown in FIG. 3e, which is applied to horizontal and vertical drive signal generator 40. Transistors 41, 43, 53 and 54, therefore act as a comparator to produce a vertical synchronizing pulse in response to a positive-going integrated composite sync signal input.

The operation of sync processor 30 has been described with respect to a composite sync signal having positive sync components. As previously mentioned, the video detector utilized in a particular receiver may reproduce the portion of the composite video signal modulating envelope that results in a composite sync signal having negative-going sync components. FIG. 1A illustrates a sync separator circuit 82 which receives at a terminal 83 a signal having synchronizing pulse components which increase in amplitude in a positive direction. This signal is applied to the base of a transistor 84, which is biased by the source of potential $+V_1$ and collector resistors 85 and 86 to switch in response to the presence of sync pulse components which exceed a predetermined amplitude, thereby producing a composite sync signal at its collector. Sync separator 82 incorporates a composite sync signal integrator 87 comprising a resistor 90 and a capacitor 91 which discharges appreciably from a reference voltage during the presence of vertical sync components, producing a signal such as that shown in FIG. 3f. Sync separator 82 also incorporates a composite sync signal differentiator 92 comprising a capacitor 93, resistors 94 and 95 and a diode 96. Differentiator 92 is responsive to the horizontal sync components in the composite sync signal to produce a signal having negative-going horizontal sync-related pulses. In a television receiver having circuitry which operates in a manner similar to sync separator 82, the output from composite sync integrator 87 is applied to sync processor 30 via terminal 31 and the output of sync differentiator 92 is applied to sync processor 30 via terminal 32.

With sync separator 82 providing negative-going sync component signals, sync processor 30 operates as follows. When pulses of the differentiated composite sync signal increase negatively to an amplitude which is approximately 2 $V_{BE}$ below ground, transistor 61 becomes forward biased and turns on, bringing its collector low which also turns transistors 74 and 75 on. Transistor 60 is reverse biased, thereby keeping transistors 64 and 65 off. Conduction of transistor 74 brings its collector low, turning transistor 67 off. The collector of 67 then is high, producing a positive processed horizontal sync pulse which is applied to horizontal and vertical drive signal generator 40 via conductor HS. Sync processor 30 therefore illustratively provides a positive-going processed horizontal sync pulse independent of the polarity of the composite sync signal.

With transistor 75 turned on, the collector of transistor 76 will be low, transistor 81 will be off and transistor 71 will therefore be off, making its collector high. Transistor 80 will therefore be turned on, causing its collector to go low, thereby rendering transistors 43 and 53 nonconductive. As long as the amplitude of the integrated composite sync signal at terminal 31 is more positive than the level of reference potential REF 1, transistors 41 and 42 are off. In that case current flows from the source of potential $+V_2$ through resistor 45 and the emitter-collector junction of transistor 46 to the base of transistor 55. Current flow raises the voltage across resistor 47, turning transistor 55 on, causing its collector to go low and producing a low pulse on conductor VS. When the amplitude of the integrated composite sync signal becomes less positive than the level of REF 1, transistors 41 and 42 are turned on, thereby turning transistor 46 off. The voltage across resistor 47 drops, turning transistor 55 off, so that a positive pulse appears on conductor VS. Sync processor 30 therefore illustratively also provides a positive processed vertical sync pulse independent of the polarity of the composite sync signal. The polarity of the horizontal sync components therefore controls the output of flip-flop 72, which is a polarity-indicative control signal that determines which of the vertical sync processors become energized. An integrated circuit with sync processor 30 may therefore be utilized in a television receiver regardless of the type of video detector output since processed sync pulses will always have a predetermined polarity independent of the polarity of the composite video or sync signal. Only two integrated circuit interface terminals or pins are required, since sync processor 30 determines incoming sync component polarity automatically. Therefore, an additional interface pin designating sync polarity is not required. The polarity of the differentiated horizontal sync components is used to select the proper vertical sync reference potential to provide proper threshold detection of the vertical sync pulses.

As shown in FIG. 1, sync separator circuit 15 includes a diode 27 which is coupled cathode to anode between the output of sync differentiator 23 and ground. Diode 27 prevents the voltage at terminal 32 from decreasing to more than one $V_{BE}$ below ground, thereby insuring that transistor 61 will remain off with positive-going sync. Sync separator 82 includes a diode 96 coupled anode to cathode between the output of sync differentiator 92 and ground. Diode 96 prevents the voltage at terminal 32 from rising above $V_{BE}$, thereby insuring that transistor 60 remains off with negative-going sync. Diodes 27 and 96 therefore prevent noise transients or undesirable signal level variations from interfering with the proper operation of sync processor 30.

What is claimed is:

1. Synchronizing apparatus for use in a television receiver having a source of at least one of horizontal and vertical synchronizing pulse-related signals, said synchronizing apparatus capable of being used in said television receiver regardless of the polarity of said one synchronizing pulse-related signal, said apparatus comprising:

first sync processing means responsive to said one synchronizing pulse-related signal of a first polarity for producing a synchronized output signal when energized;

second sync processing means responsive to said one pulse-related signal of a second polarity for producing a synchronized output signal when energized;

means responsive to said synchronizing pulse-related signals for producing a control signal indicative of the polarity of said one pulse-related signal; and means for applying said polarity-indicative control signal to said first and second sync processing means for energizing one of said first and second sync processing means such that said energized sync processing means produces a synchronized output signal.

2. The arrangement defined in claim 1, wherein said first and second sync processing means are responsive to said vertical synchronizing pulse-related signals.

3. The arrangement defined in claim 2, wherein said source of vertical synchronizing pulse-related signals comprises an integrator responsive to a composite synchronizing signal for producing an integrated output signal.

4. The arrangement defined in claim 3, wherein said first and second sync processing means comprise first and second threshold comparators including sources of reference potential for establishing comparator reference levels, said first and second threshold comparators comparing said integrated output signal with said reference levels when said first and second sync processing means are energized for providing an output signal indicative of said comparison.

5. The arrangement defined in claim 2, wherein said means for applying said polarity-indicative control signal to said first and second sync processing means comprises a flip-flop having first and second output states, said first output state energizing said first sync processing means and said second output state energizing said second sync processing means.

6. The arrangement defined in claim 5, wherein said means for producing a control signal is responsive to said horizontal synchronizing pulse-related signals for providing an output signal to said flip-flop.

7. The arrangement defined in claim 1, wherein said means for producing a control signal comprises a differentiator responsive to a composite synchronizing signal for producing an output signal representative of said horizontal synchronizing pulse-related signals.

8. Apparatus for use in a televison receiver having a source of horizontal and vertical synchronizing pulse-related signals of one of a first or second polarity comprising:

first sync processing means responsive to one of said horizontal and vertical synchronizing pulse related signals of either of said first or second polarities for producing a first output signal indicative of the polarity of said pulse-related signal and a second output signal comprising first synchronizing information;

second sync processing means capable of being responsive to the other of said horizontal and vertical synchronizing pulse-related signals of said first or second polarity; and means responsive to said first output signal for causing said second sync processing means to become responsive to said other of said synchronizing pulse-related signal of said indicated polarity for producing a third output signal comprising second synchronizing information.

9. The arrangement defined in claim 8 wherein said first sync processing means is responsive to said horizontal synchronizing pulse-related signals.

10. The arrangement defined in claim 8, wherein said second sync processing means is responsive to said vertical synchronizing pulse-related signals.

11. In a television receiver having means for providing horizontal and vertical synchronizing pulse-related signals of one of first and second polarities, means responsive to said signals of either said first and second polarity for providing processed horizontal and vertical synchronizing pulses comprising:

first and second input means, said first input means responsive to said horizontal synchronizing pulse-related signals of said first polarity and substantially unresponsive to said horizontal synchronizing pulse-related signals of said second polarity, said second input means responsive to said horizontal synchronizing pulse-related signals of said second polarity and substantially unresponsive to said horizontal synchronizing pulse-related signals of said first polarity;

switch means coupled to said first and second input means for providing a first output signal when said first input means is responsive and providing a second output signal when said second input means is responsive;

first output means coupled to said switch means for providing horizontal synchronizing pulses in response to either of said first or second output pulses;

third input means coupled to said switch means and responsive to said switch means first output signal for enabling said third input means to be responsive to said vertical synchronizing pulse-related signal;

fourth input means coupled to said switch means and responsive to said switch means second output signal for enabling said fourth input means to be responsive to said vertical synchronizing pulse-related signal; and second output means coupled to said third and fourth input means for providing vertical synchronizing pulses.

12. The arrangement defined in claim 11 wherein said first and second input means comprises first and second transistors.

13. The arrangement defined in claim 11 wherein said switch means comprises a flip-flop.

14. The arrangement defined in claim 11 wherein said third and fourth input means comprise first and second comparators.

* * * * *

UNITED STATES PATENT AND TRADEMARK OFFICE
CERTIFICATE OF CORRECTION

PATENT NO. : 4,453,183
DATED : June 5, 1984
INVENTOR(S) : ALVIN REUBEN BALABAN ET AL.

It is certified that error appears in the above—identified patent and that said Letters Patent is hereby corrected as shown below:

| | |
|---|---|
| Column 3, line 27 | that portion reading "puls" should read -- pulse --; |
| Column 4, line 56 | that portion reading "base" should read -- bases --; |
| Column 5, line 17 | that portion reading "Transistor 60" should read -- Transistor 61 --. |

Signed and Sealed this

Ninth Day of April 1985

[SEAL]

Attest:

DONALD J. QUIGG

Attesting Officer     Acting Commissioner of Patents and Trademarks